(12) United States Patent
Wang

(10) Patent No.: US 12,058,685 B2
(45) Date of Patent: Aug. 6, 2024

(54) UPLINK INFORMATION TRANSMISSION METHOD, USER TERMINAL AND COMPUTER-READABLE STORAGE MEDIUM

(71) Applicant: BEIJING UNISOC COMMUNICATIONS TECHNOLOGY CO., LTD., Beijing (CN)

(72) Inventor: Hualei Wang, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 333 days.

(21) Appl. No.: 17/606,345

(22) PCT Filed: Apr. 20, 2020

(86) PCT No.: PCT/CN2020/085491
§ 371 (c)(1),
(2) Date: Oct. 25, 2021

(87) PCT Pub. No.: WO2020/216154
PCT Pub. Date: Oct. 29, 2020

(65) Prior Publication Data
US 2022/0256530 A1    Aug. 11, 2022

(30) Foreign Application Priority Data
Apr. 26, 2019 (CN) .......................... 201910346117.8

(51) Int. Cl.
H04W 72/21    (2023.01)
H04L 5/00     (2006.01)
(Continued)

(52) U.S. Cl.
CPC .......... *H04W 72/21* (2023.01); *H04L 5/0051* (2013.01); *H04L 27/26025* (2021.01); *H04L 27/2613* (2013.01); *H04W 72/0466* (2013.01)

(58) Field of Classification Search
CPC .............. H04W 72/0466; H04W 72/21; H04L 27/26025; H04L 27/2613; H04L 5/0051;
(Continued)

(56) References Cited

U.S. PATENT DOCUMENTS 9,025,485 B2    5/2015    Yoon
9,474,050 B2   10/2016    Park et al.
(Continued)

FOREIGN PATENT DOCUMENTS

| CN | 101772220 A | 7/2010 |
| CN | 102869097 A | 1/2013 |

(Continued)

OTHER PUBLICATIONS

ZTE, "Enhancements on Multi-TRP and Multi-panel Transmission", *3GPP TSG RAN WG1 #96bis, R1-1904013*, Xi'an, China, Apr. 12, 2019 (Apr. 12, 2019) (8 pages).
(Continued)

*Primary Examiner* — Khaled M Kassim
*Assistant Examiner* — Zhaohui Yang
(74) *Attorney, Agent, or Firm* — Harness, Dickey & Pierce, P.L.C.

(57) ABSTRACT

An uplink information transmission method, as well as a user terminal and a computer-readable storage medium are provided, the method includes: receiving network configuration information, wherein the network configuration information comprises identification information for indicating a target transmission reception point; generating uplink information corresponding to the identification information of the target transmission reception point based on the identifica-
(Continued)

tion information of the target transmission reception point; and transmitting the uplink information.

12 Claims, 1 Drawing Sheet

(51) Int. Cl.
*H04L 27/26* (2006.01)
*H04W 72/044* (2023.01)

(58) Field of Classification Search
CPC .............. H04L 1/1854; H04L 1/1896; H04L 25/03866; H04L 27/26136; H04L 5/0023; H04L 5/0048; H04L 5/0053; H04L 5/0055
See application file for complete search history.

(56) References Cited

U.S. PATENT DOCUMENTS

| | | | |
|---|---|---|---|
| 9,660,781 | B2 | 5/2017 | Liu et al. |
| 9,717,076 | B2 | 7/2017 | Park et al. |
| 9,723,598 | B2 | 8/2017 | Park et al. |
| 9,787,514 | B2 | 10/2017 | Yoon |
| 10,237,104 | B2 | 3/2019 | Yoon |
| 10,237,859 | B2 | 3/2019 | Park et al. |
| 10,264,559 | B2 | 4/2019 | Park et al. |
| 10,841,142 | B1 | 11/2020 | Yoon |
| 11,101,909 | B2 | 8/2021 | Chen et al. |
| 11,411,792 | B2 | 8/2022 | Yoon |
| 2013/0301452 | A1 | 11/2013 | Yoon |
| 2014/0119336 | A1 | 5/2014 | Liu et al. |
| 2014/0376356 | A1 | 12/2014 | Park et al. |
| 2015/0029968 | A1 | 1/2015 | Park et al. |
| 2015/0236883 | A1 | 8/2015 | Yoon |
| 2015/0296533 | A1 | 10/2015 | Park |
| 2016/0286538 | A1 | 9/2016 | Park et al. |
| 2016/0366717 | A1 | 12/2016 | Yang et al. |
| 2017/0013613 | A1 | 1/2017 | Park et al. |
| 2017/0311313 | A1 | 10/2017 | Park et al. |
| 2018/0048508 | A1 | 2/2018 | Yoon |
| 2018/0091212 | A1 | 3/2018 | Lee et al. |
| 2018/0270798 | A1 | 9/2018 | Park et al. |
| 2018/0367358 | A1 | 12/2018 | Baligh et al. |
| 2019/0081750 | A1 | 3/2019 | Yang et al. |
| 2020/0015229 | A1* | 1/2020 | Yang ............... H04W 76/15 |
| 2020/0015250 | A1* | 1/2020 | Yang ............... H04L 5/001 |
| 2020/0099461 | A1* | 3/2020 | Chen ............... H04K 3/00 |
| 2020/0162228 | A1* | 5/2020 | Gao ............... H04L 5/0051 |
| 2020/0187266 | A1 | 6/2020 | Lou et al. |
| 2020/0389914 | A1 | 12/2020 | Zhao |
| 2021/0075660 | A1 | 3/2021 | Yoon |

FOREIGN PATENT DOCUMENTS

| | | |
|---|---|---|
| CN | 104137450 A | 11/2014 |
| CN | 104471885 A | 3/2015 |
| CN | 104798334 A | 7/2015 |
| CN | 104853339 A | 8/2015 |
| CN | 105493603 A | 4/2016 |
| CN | 106375074 A | 2/2017 |
| CN | 106411475 A | 2/2017 |
| CN | 107666373 A | 2/2018 |
| CN | 108401488 A | 8/2018 |
| CN | 108633071 A | 10/2018 |
| CN | 108988978 A | 12/2018 |
| CN | 109392188 A | 2/2019 |
| CN | 109644116 A | 4/2019 |
| WO | 2019018973 A1 | 1/2019 |
| WO | WO-2019052484 A1 | 3/2019 |

OTHER PUBLICATIONS

International Search Report (English and Chinese) and Written Opinion (Chinese) of the International Searching Authority issued in PCT/CN2020/085491, mailed Jul. 20, 2020; ISA/CN (8 pages).
AT&T, "Overview of Multi-TRP/Panel Enhancements," R1-1810682, 3GPP TSG-RAN WG1, Meeting #94bis, Agenda tem: 7.2.8.2, Oct. 8-12, 2018, Chengdu, China; retrieved from the Internet (URL: http://www.3gpp.org/ftp/tsg%5Fran/WG1%5FRL1/TSGR1%5F94b/Docs/R1%2D1810682%2Ezip) on Dec. 11, 2018 by the EPO.
European Search Report regarding Application No. 20794689.8, dated Jan. 4, 2023.
Qualcomm Incorporated, "Multi-TRP Enhancements," R1-1905026, 3GPP TSG-RAN WG1, Meeting #96b, Agenda tem: 7.2.8.2, Apr. 8-12, 2019, Xi'an, China; retrieved from the Internet (URL: http://www.3gpp.org/ftp/Meetings%5F3GPP%5FSYNC/RAN1/Docs/R1%2D1905026%2Ezip) on Apr. 8, 2019 by the EPO.
3GPP TSG RAN WG1 Meeting NR#3, NR-PDCCH Design for Multi-TRP Transmission, Nagoya, Japan, Sep. 18-21, 2017.
3GPP TSG RAN WG1 Meeting #95R1-1813384, Views on Multi-Beam Operation, 7.2.8.3 Enhancements on Multi-Beam Operation, Spokane, Washington, Nov. 16, 2018.
1st Chinese Office Action issued in Chinese Application No. 201910346117.8 on Jan. 29, 2022. English translation provided by Unitalen Attorneys at Law.
Li, Zexian et al; "5GURLLC: Design Challenges and System Concepts", 2018 15th International Symposium on Wireless Communication Systems.
Second Chinese Office Action regarding Application No. 201910346117.8 dated Jul. 21, 2022. English translation provided by Unitalen Attorneys at Law.
Gao Qiubin et al., "Analysis on Massive Beamforming in the 5GNR", Information and Communications Technology and Policy No. 11; Nov. 15, 2018; pp. 7-14.

* cited by examiner

UPLINK INFORMATION TRANSMISSION METHOD, USER TERMINAL AND COMPUTER-READABLE STORAGE MEDIUM

CROSS-REFERENCE TO RELATED APPLICATIONS

This application is the national phase of International Application No. PCT/CN2020/085491, filed on Apr. 20, 2020, which claims priority to Chinese Patent Application No. 201910346117.8, filed on Apr. 26, 2019, and entitled "UPLINK INFORMATION TRANSMISSION METHOD, USER TERMINAL AND COMPUTER-READABLE STORAGE TEDIUM", the entire disclosures of which are incorporated herein by reference.

TECHNICAL FIELD

The present disclosure generally relates to wireless communication technology field, and more particularly, to an uplink information transmission method, user terminal and computer-readable storage medium.

BACKGROUND

New Radio (NR) R16 supports multiple Transmission Reception Point (multi-TRP) transmission, that is, supports a user terminal to communicate with a plurality of transmission reception points. When uplink information is transmitted by a user terminal, a plurality of transmission reception points may all receive the uplink information transmitted by the user terminal.

If an existing method for transmitting uplink information in a R15 is adopted, a transmission reception point cannot know whether it is a target transmission reception point.

SUMMARY

Embodiments in the present disclosure provide a method for transmitting uplink information.

In an embodiment of the present disclosure, a method for tetrahedral interpolation calculation is provided. The method includes: receiving network configuration information, wherein the network configuration information comprises identification information for indicating a target transmission reception point; generating uplink information corresponding to the identification information of the target transmission reception point based on the identification information of the target transmission reception point; and transmitting the uplink information.

In an embodiment of the present disclosure, a user terminal is provided, the device includes: a receiving circuitry, adapted to receive network configuration information, wherein the network configuration information includes identification information for indicating a target transmission reception point; a generation circuitry, adapted to generate uplink information corresponding to the identification information of the target transmission reception point based on the identification information of the target transmission reception point; and a transmission circuitry, adapted to transmit the uplink information.

In an embodiment of the present disclosure, a non-transitory computer-readable storage medium storing one or more programs, the one or more programs comprising computer instructions, which, when executed by a processor, cause the processor to: receiving network configuration information, wherein the network configuration information comprises identification information for indicating a target transmission reception point; generating uplink information corresponding to the identification information of the target transmission reception point based on the identification information of the target transmission reception point; and transmitting the uplink information.

DETAILED DESCRIPTION

In an existing technology, different transmission reception points cannot recognize which transmission reception point a user terminal performs data transmission.

In embodiments of the present disclosure, based on identification information of a target transmission reception point in network configuration information, corresponding uplink information is generated and transmitted, so that each transmission reception point can know whether it is the target transmission reception point corresponding to the uplink information.

In order to clarify the object, characteristic and advantages of embodiments of the present disclosure, the embodiments of present disclosure will be described clearly in detail in conjunction with accompanying drawings.

Figure 1:
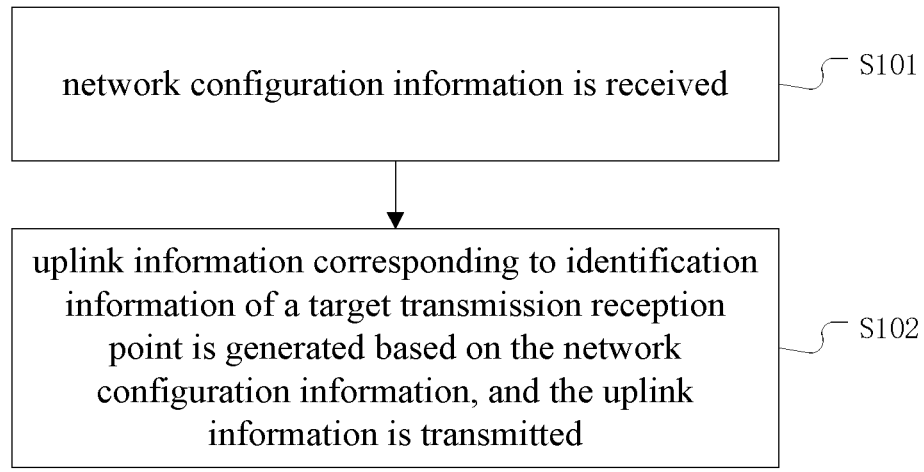
FIG. 1 schematically illustrates a flowchart of a method for transmitting uplink information according to an embodiment of the present disclosure.

In an embodiment of the present disclosure, a method for transmitting uplink information is provided, referring to FIG. 1, detailed process is described as in S101 and S102.

In S101, network configuration information is received.

In some embodiment, when a base station indicates a user terminal to perform data transmission with a plurality of transmission reception points, the base station can transmit downward network configuration information to the user terminal. The network configuration information can be used to indicate which target transmission reception point the user terminal communicates with.

In some embodiment of the present disclosure, network configuration information may include identification information for indicating a target transmission reception point. After the network configuration information is received by a user terminal, a user can know which transmission reception point to perform uplink information transmission with.

In some embodiment, a base station may transmit downward network configuration information to a user terminal through a higher layer signaling. For example, a base station may transmit downward network configuration information to a user terminal through a Radio Resource control (RRC) signaling. Or, a base station may transmit downward network configuration information to a user terminal through Downlink Control Information (DCI).

In S102, uplink information corresponding to identification information of a target transmission reception point is generated based on the network configuration information, and the uplink information is transmitted.

In some embodiment, identification information corresponding to uplink transmission resource configured for a same user terminal by different transmission reception points is different. Thus, after network configuration information is received by the user terminal, and the user terminal can determine which transmission reception point transmits downward the network configuration information based on the network configuration information. Thus, the user terminal can obtain identification information of a target transmission reception point based on the network configuration information.

In some embodiment, identification information corresponding to uplink transmission resource may be identification information corresponding to a Physical Uplink Control Channel (PUCCH) resource.

For example, identification information corresponding to PUCCH resources configured for a user terminal by transmission reception point 1 is 0, 2, 4 and 6; identification information corresponding to PUCCH resources configured for the user terminal by transmission reception point 2 is 1, 3, 5 and 7. Transmission reception point 1 and transmission reception point 2 can inform the user terminal of the PUCCH resources used based on network configuration information. When the user terminal detects that identification information corresponding to PUCCH resources in the network configuration information is 0, 2, 4 and 6, the user terminal knows that the network configuration information is transmitted by transmission reception point 1, thus, the user terminal knows that an identification of a transmission reception point is 1.

In some embodiment, different downlink transmission resources may be used when information is transmitted to a same user terminal through different transmission reception points, and different downlink transmission resources correspond to different transmission reception points. Thus, the user terminal can obtain information of a transmission reception point corresponding to the downlink transmission resource based on the downlink transmission resource.

In some embodiment, identification information corresponding to a downlink transmission resource may be identification information corresponding to a control resource set (CORESET).

A user terminal can generate uplink information corresponding to the identification information of the target transmission reception point based on the identification information of the target transmission reception point, and transmit the uplink information.

In some embodiment, when uplink information is an uplink reference signal, a user terminal may obtain an initial value of an uplink reference signal based on identification information of a target transmission reception point; generate corresponding uplink reference signal; and transmit the uplink reference signal.

In some embodiment, specific principle and process of generating the uplink reference signal based on the initial value of the uplink reference signal can refer to an existing protocol, and thus are not described hereinafter.

In some embodiment, an initial value $c_{init}$ of an uplink reference signal can be calculated based on following formula:

$$c_{init}=(2^{17}(N_{symb}^{slot}n_{s,f}^{\mu}+l+1)(2N_{ID}^{0}+1)+2N_{ID}^{0}+n) \bmod 2^{31} \quad (1)$$

Wherein, n is related to the identification information of the target transmission reception point, and different transmission reception points correspond to different values of n; l represents an OFDM symbol number within a slot, $n_{s,f}^{\mu}$ represents a slot number in a radio frame f with a subcarrier spacing μ; in response to $N_{ID}^{0}$ being configured by a higher layer, the $N_{ID}^{0}$ represents a scrambling ID configured by a higher layer, otherwise the $N_{ID}^{0}$ represents a cell ID.

In practical applications, in above formula (1), except for n, physical meanings of other physical parameters can refer to provisions in an existing protocol.

In some embodiment, n may be determined based on an uplink transmission resource or downlink transmission resource. When n is determined based on the uplink transmission resource, the n can be determined through a PUCCH resource. When n is determined based on a downlink transmission resource, the n can be determined through a CORESET.

In some embodiment, n may be determined based on a resource identification (resource ID) of Physical Uplink Control Channel (PUCCH).

In some embodiment, a modulo is performed for a value of the resource ID of PUCCH on 2, and a result obtained is taken as n.

In some embodiment, n may be determined based on a resource set ID of PUCCH. And in the embodiment of the present disclosure, a modulo is performed for the value of the PUCCH resource set ID on 2, and a result obtained is taken as n.

In some embodiment, n may be determined based on a resource group ID of PUCCH. And in some embodiment, a modulo is performed for the value of the PUCCH resource group ID on 2, and a result obtained is taken as n.

In some embodiment, a modulo is performed for a value of a CORESET on 2, and a result obtained is taken as n.

In some embodiment, when an uplink information is a scrambling sequence of an uplink channel, the user terminal may obtain an initial value of a scrambling sequence of an uplink channel based on the identification information of the target transmission reception point; generate the scrambling sequence of the uplink channel based on the initial value of the scrambling sequence of the uplink channel, and adopting the scrambling sequence of the uplink channel to scramble the uplink information to be transmitted; and transmit the scrambled information.

In some embodiment, specific principle and process of generating the scrambling sequence of the uplink channel based on the initial value of the scrambling sequence of the uplink channel can be referred to an existing protocol, and thus are not described hereinafter.

In some embodiment, an initial value $c_{init}$ of the scrambling sequence of the uplink channel can be calculated based on following formula:

$$c_{init}=n_{RNTI} \cdot 2^{15}+n_{ID}+n \quad (2)$$

Wherein, n is related to the identification information of the target transmission reception point, and different transmission reception points correspond to different values of n; $n_{RNTI}$ is obtained based on a C-RNTI; in response to $n_{ID}$ being configured by a higher layer, the $n_{ID}$ represents a data scrambling ID of a Physical Uplink Shared Channel configured by a higher layer, otherwise the $n_{ID}$ represents a cell ID.

In practical applications, in above formula (2), except for n, physical meanings of other physical parameters can be referred to provisions in an existing protocol.

In some embodiment, n may be determined based on an uplink transmission resource or downlink transmission resource. When n is determined based on the uplink transmission resource, the n can be determined through a PUCCH resource. When n is determined based on a downlink transmission resource, the n can be determined through a CORESET.

In some embodiment, n may be determined based on a resource ID of PUCCH. In some embodiment, a modulo is performed for a value of the resource ID of PUCCH on 2, and a result obtained is taken as n; or, a modulo is performed for a value of the resource ID of PUCCH on 1024, and a result obtained is taken as n.

In some embodiment, n may be determined based on a resource set ID of PUCCH. In some embodiment, a modulo is performed for a value of the resource set ID of PUCCH on 2, and a result obtained is taken as n; or, a modulo is performed for a value of the resource set ID of PUCCH on 1024, and a result obtained is taken as n.

In some embodiment, n may be determined based on a resource group ID of PUCCH. In some embodiment, a modulo is performed for a value of the resource group ID of PUCCH on 2, and a result obtained is taken as n; or, a modulo is performed for a value of the resource group ID of PUCCH on 1024, and a result obtained is taken as n.

In some embodiment, n may be determined based on a CORESET. In some embodiment, a modulo is performed for a value of a CORESET on 2, and a result obtained is taken as n.

In some embodiment, the calculation rule of an initial value of an uplink reference signal generated by formula (1) and the calculation rule of an initial value of a scrambling sequence of an uplink channel generated by formula (2) can be both obtained by a user terminal and a target transmission reception point.

In some embodiment, uplink information transmitted by a user terminal can be generated based on identification information of a target transmission reception point. Thus, when the uplink information is received by a plurality of transmission reception points, the uplink information can be analyzed accordingly. Due to generation rules of initial values of uplink reference signals corresponding to different transmission reception points and generation rules of initial values of scrambling sequences scrambled by uplink channels are different, and the user terminal and the target transmission reception point know these generation rules. Thus, the uplink information can be analyzed correctly by a target transmission reception point only.

In some embodiment, a user terminal may feed corresponding transmission data back to a target transmission reception point and other transmission reception points based on network configuration information. In the embodiment of the present disclosure, the transmission data fed back to the target transmission reception point and the other transmission reception points by the user terminal may be HARQ-ACK information, and an uplink transmission resource used by the user terminal is a PUCCH resource.

A user terminal may detect whether an uplink transmission resource corresponding to a target transmission reception point and uplink transmission resources corresponding to other transmission reception points overlap, a logical AND operation is performed on transmission data of the uplink transmission resource corresponding to the target transmission reception point and transmission data of uplink transmission resources corresponding to other transmission reception points, in response to detecting that the uplink transmission resource corresponding to the target transmission reception point and uplink transmission resources corresponding to other transmission reception points overlap, and transmit a result of the logical AND operation as uplink information.

For example, HARQ-ACK information carried in a PUCCH resource transmitted to TRP1 (transmission reception 1) by a user terminal is ACK, HARQ-ACK information carried in a PUCCH resource transmitted to TRP2 (transmission reception 2) is NACK. When the PUCCH resource transmitted to TRP1 and the PUCCH resource transmitted to TRP2 overlap, the user terminal performs a logical AND operation on the HARQ-ACK information carried in the PUCCH resource transmitted to TRP1 and the HARQ-ACK information carried in the PUCCH resource transmitted to TRP2, that is, performs a logical AND operation on ACK and NACK, and the result is NACK. Thus, HARQ-ACK information fed back to TRP1 and TRP2 respectively is NACK. The user terminal performing a logical AND operation on ACK and NACK means that taking ACK as a logical 1, and taking NACK as a logical 0, a result of the logical AND operation on ACK and NACK is 0 which is correspond to NACK.

For another example, HARQ-ACK information carried in a PUCCH resource transmitted to TRP1 (transmission reception 1) by a user terminal is ACK, HARQ-ACK information carried in a PUCCH resource transmitted to TRP2 (transmission reception 2) is ACK. When the PUCCH resource transmitted to TRP1 and the PUCCH resource transmitted to TRP2 overlap, the user terminal performs a logical AND operation on the HARQ-ACK information carried in the PUCCH resource transmitted to TRP1 and the HARQ-ACK information carried in the PUCCH resource transmitted to TRP2, that is, performs a logical AND operation on ACK and ACK, and the result is ACK. Thus, HARQ-ACK information fed back to TRP1 and TRP2 by the user terminal respectively is ACK.

For another example, HARQ-ACK information carried in a PUCCH resource transmitted to TRP1 (transmission reception 1) by a user terminal is NACK, HARQ-ACK information carried in a PUCCH resource transmitted to TRP2 (transmission reception 2) is NACK. When the PUCCH resource transmitted to TRP1 and the PUCCH resource transmitted to TRP2 overlap, the user terminal performs a logical AND operation on the HARQ-ACK information carried in the PUCCH resource transmitted to TRP1 and the HARQ-ACK information carried in the PUCCH resource transmitted to TRP2, that is, performs a logical AND operation on NACK and NACK, and the result is NACK. Thus, HARQ-ACK information fed back to TRP1 and TRP2 by the user terminal respectively is NACK.

It should be noted that an uplink transmission resource overlapping in embodiments of the present disclosure may include any one of overlaps including an overlap in time domain, an overlap in a frequency domain, and an overlap in time-frequency domain. In embodiments of the present disclosure, the uplink transmission resource overlap may be an overlap on some symbol, or a complete overlap in time domain and frequency domain.

In practical applications, when PUCCH resources transmitted to different TRPs by a user terminal overlap, the user terminal can only transmit HARQ-ACK information to one of the TRPs. However, the HARQ-ACK information transmitted by the user terminal may be received by a plurality of TRPs.

Assuming that a PUCCH resource transmitted to TRP1 by the user terminal and a PUCCH resource transmitted to TRP2 by the user terminal overlap, HARQ-ACK information fed back to TRP1 by a user terminal is NACK, HARQ-ACK information fed back to TRP2 by a user terminal is ACK. However, the user terminal can only feed back the HARQ-ACK information corresponding to TRP1 or feed back the HARQ-ACK information corresponding to TRP2. If the user terminal feed the HARQ-ACK information back to TRP2, TRP1 may also receive the HARQ-ACK information transmitted by the user terminal, and the HARQ-ACK information received by TRP1 is ACK. However, HARQ-ACK information corresponding to TRP1 should be NACK.

In other word, HARQ-ACK information received by TRP1 may not be HARQ-ACK information which a user terminal needs to feed back to TRP1. If TRP1 receives ACK as HARQ-ACK information, it is determined that the user terminal receives correctly, however, the user terminal does not correctly receive data transmitted by TRP1. In this case, the user terminal may not be able to communicate with TRP1 normally.

In embodiments of the present disclosure, in order to avoid the above situation, a logical AND operation is performed on HARQ-ACK information carried in a PUCCH resource transmitted to TRP1 and HARQ-ACK information carried in a PUCCH resource transmitted to TRP2 by a user terminal. If HARQ-ACK information carried in a PUCCH resource transmitted to any one of TRPs is NACK, HARQ-ACK information transmitted by the user terminal is NACK which makes both TRP1 and TRP2 retransmit to the user terminal, and the user terminal in return re-feed back to TRP1 and TRP2, which avoids a situation that the user terminal cannot communicate with TRP1 normally.

Figure 2:
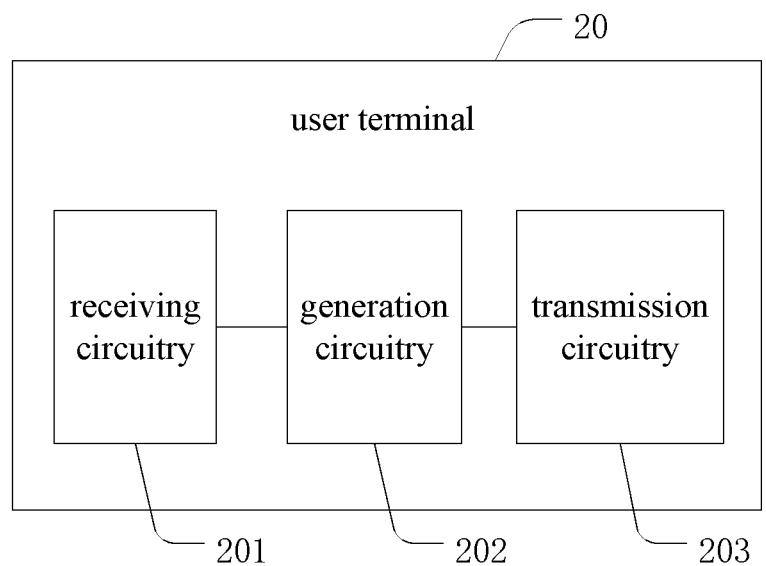
FIG. 2 schematically illustrates a schematic structural diagram of a user terminal according to an embodiment of the present disclosure.

Referring to FIG. 2, a user terminal in an embodiment of the present disclosure is provided, the user terminal includes: a receiving circuitry 201, a generation circuitry 202, and a transmission circuitry 203.

Wherein, the receiving circuitry 201 is adapted to receive network configuration information, and the network configuration information includes identification information for indicating a target transmission reception point.

The generation circuitry 202 is adapted to generate uplink information corresponding to the identification information of the target transmission reception point based on the identification information of the target transmission reception point.

The transmission circuitry 203 is adapted to transmission the uplink information.

In some embodiment, the generation circuitry 202 may be adapted to obtain an initial value of an uplink reference signal based on identification information of a target transmission reception point; and generate the uplink reference signal based on the initial value of the uplink reference signal.

In some embodiment, the generation circuitry 202 may be adapted to calculate an initial value $c_{init}$ of an uplink reference signal based on following formula: $c_{init}=(2^{17}(N_{symb}^{slot}n_{s,f}^{\mu}+l+1)(2N_{ID}^{0}+1)+2N_{ID}^{0}+n) \bmod 2^{31}$; wherein, n is related to the identification information of the target transmission reception point, and different transmission reception points correspond to different values of n; l represents an OFDM symbol number in a slot, $n_{s,f}^{\mu}$ represents a slot number in a radio frame f with a subcarrier spacing μ; in response to $N_{ID}^{0}$ being configured by a higher layer, the $N_{ID}^{0}$ represents a scrambling ID configured by a higher layer, otherwise the $N_{ID}^{0}$ represents a cell ID.

In some embodiment, the generation circuitry 202 may be adapted to obtain an initial value of a scrambling sequence of an uplink channel based on the identification information of the target transmission reception point; generate the scrambling sequence of the uplink channel based on the initial value of the scrambling sequence of the uplink channel, and adopt the scrambling sequence of the uplink channel to scramble the uplink information to be transmitted.

In some embodiment, the generation circuitry 202 may be adapted to calculate the initial value $c_{init}$ of the scrambling sequence of the uplink channel based on following formula: $c_{init}=n_{RNTI}\cdot2^{15}+n_{ID}+n$; wherein, n is related to the identification information of the target transmission reception point, and different transmission reception points correspond to different values of n; $n_{RNTI}$ is obtained based on a C-RNTI; in response to $n_{ID}$ being configured by a higher layer, the $n_{ID}$ represents a data scrambling ID of a Physical Uplink Shared Channel configured by a higher layer, otherwise the $n_{ID}$ represents a cell ID.

In some embodiment, the generation circuitry 202 may be adapted to perform a logical AND operation on transmission data of an uplink transmission resource corresponding to the target transmission reception point and transmission data of uplink transmission resources corresponding to other transmission reception points, in response to detecting that the uplink transmission resource corresponding to the target transmission reception point and uplink transmission resources corresponding to other transmission reception points overlap; and taking a result of the logical AND operation as the uplink information.

In an embodiment of the present disclosure, a computer-readable storage medium having computer instructions stored therein is provided, the computer-readable storage medium is a non-volatile storage medium or a non-transitory storage medium, wherein once the computer instructions are executed, the method as described above can be performed.

In an embodiment of the present disclosure, a user terminal comprising a memory and a processor is provided, wherein the memory has computer instructions stored therein, and the method as described above can be performed, once the processor executes the computer instructions.

Those skilled in the art can understand that all or part of the processes in the various methods of the above-mentioned embodiments can be completed by a program instructing relevant hardware. The program can be stored in any computer-readable storage medium, and the storage medium may include: ROM, RAM, magnetic disk or CD, etc.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A method for transmitting uplink information, comprising:
   receiving network configuration information, wherein the network configuration information comprises identification information for indicating a target transmission reception point;
   generating uplink information corresponding to the identification information of the target transmission reception point based on the identification information of the target transmission reception point; and
   transmitting the uplink information;
   wherein said generating the uplink information corresponding to the identification information of the target transmission reception point based on the identification information of the target transmission reception point comprises:
      obtaining an initial value of a scrambling sequence of an uplink channel based on the identification information of the target transmission reception point;
      generating the scrambling sequence of the uplink channel based on the initial value of the scrambling sequence of the uplink channel; and adopting the scrambling sequence of the uplink channel to scramble the uplink information to be transmitted;

wherein said obtaining the initial value of the scrambling sequence of the uplink channel based on the identification information of the target transmission reception point comprises:

calculating the initial value $c_{init}$ of the scrambling sequence of the uplink channel based on following formula, $$c_{init} = n_{RNTI} \cdot 2^{15} + n_{ID} + n,$$

where n is related to the identification information of the target transmission reception point, and different transmission reception points correspond to different values of n; $n_{RNTI}$ is obtained based on a C-RNTI; in response to $n_{ID}$ being configured by a higher layer, the $n_{ID}$ represents a data scrambling ID of a Physical Uplink Shared Channel configured by a higher layer, otherwise the $n_{ID}$ represents a cell ID.

2. The method according to claim 1, wherein said generating the uplink information corresponding to the identification information of the target transmission reception point based on the identification information of the target transmission reception point comprises:

obtaining an initial value of an uplink reference signal based on the identification information of the target transmission reception point; and generating the uplink reference signal based on the initial value of the uplink reference signal.

3. The method according to claim 2, wherein said obtaining the initial value of the uplink reference signal based on the identification information of the target transmission reception point comprises:

calculating the initial value $c_{init}$ of the uplink reference signal based on following formula, $$c_{init} = (2^{17}(N_{symb}^{slot} n_{s,f}^{\mu} + l + 1)(2N_{ID}^0 + 1) + 2N_{ID}^0 + n) \bmod 2^{31}$$

wherein, n is related to the identification information of the target transmission reception point, and different transmission reception points correspond to different values of n; l represents an OFDM symbol number within a slot, $n_{s,f}^{\mu}$ represents a slot number in a radio frame f with a subcarrier spacing μ; in response to $N_{ID}^0$ being configured by a higher layer, the $N_{ID}^0$ represents a scrambling ID configured by a higher layer, otherwise the $N_{ID}^0$ represents a cell ID.

4. The method according to claim 1, wherein said generating the uplink information corresponding to the identification information of the target transmission reception point based on the network configuration information comprises:

performing a logical AND operation on transmission data of an uplink transmission resource corresponding to the target transmission reception point and transmission data of uplink transmission resources corresponding to other transmission reception points, in response to detecting that the uplink transmission resource corresponding to the target transmission reception point and uplink transmission resources corresponding to other transmission reception points overlap; and taking a result of the logical AND operation as the uplink information.

5. A user terminal, comprising:

a receiving circuitry, adapted to receive network configuration information, wherein the network configuration information comprises identification information for indicating a target transmission reception point;

a generation circuitry, adapted to generate uplink information corresponding to the identification information of the target transmission reception point based on the identification information of the target transmission reception point; and a transmission circuitry, adapted to transmit the uplink information;

wherein the generation circuitry is adapted to obtain an initial value of a scrambling sequence of an uplink channel based on the identification information of the target transmission reception point; generate the scrambling sequence of the uplink channel based on the initial value of the scrambling sequence of the uplink channel, and adopt the scrambling sequence of the uplink channel to scramble the uplink information to be transmitted;

wherein the generation circuitry is adapted to calculate the initial value $c_{init}$ of the scrambling sequence of the uplink channel based on following formula:

$$c_{init} = n_{RNTI} \cdot 2^{15} + n_{ID} + n,$$

where n is related to the identification information of the target transmission reception point, and different transmission reception points correspond to different values of n; $n_{RNTI}$ is obtained based on a C-RNTI; in response to $n_{ID}$ being configured by a higher layer, the $n_{ID}$ represents a data scrambling ID of a physical uplink shared channel configured by a higher layer, otherwise the $n_{ID}$ represents a cell ID.

6. The user terminal according to claim 5, wherein the generation circuitry is adapted to obtain an initial value of an uplink reference signal based on the identification information of the target transmission reception point; and generate the uplink reference signal based on the initial value of the uplink reference signal.

7. The user terminal according to claim 6, wherein the generation circuitry is adapted to calculate the initial value $c_{init}$ of the uplink reference signal based on following formula: $c_{init} = (2^{17}(N_{symb}^{slot} n_{s,f}^{\mu} + l + 1)(2N_{ID}^0 + 1) + 2N_{ID}^0 + n) \bmod 2^{31}$; wherein, n is related to the identification information of the target transmission reception point, and different transmission reception points correspond to different values of n; l represents an OFDM symbol number in a slot, $n_{s,f}^{\mu}$ represents a slot number in a radio frame f with a subcarrier spacing μ; in response to $N_{ID}^0$ being configured by a higher layer, the $N_{ID}^0$ represents a scrambling ID configured by a higher layer, otherwise the $N_{ID}^0$ represents a cell ID.

8. The user terminal according to claim 5, wherein the generation circuitry is adapted to perform a logical AND operation on transmission data of an uplink transmission resource corresponding to the target transmission reception point and transmission data of uplink transmission resources corresponding to other transmission reception points, in response to detecting that the uplink transmission resource corresponding to the target transmission reception point and uplink transmission resources corresponding to other transmission reception points overlap; and take a result of the logical AND operation as the uplink information.

9. A non-transitory computer-readable storage medium storing one or more programs, the one or more programs comprising computer instructions, which, when executed by a processor, cause the processor to:

receive network configuration information, wherein the network configuration information comprises identification information for indicating a target transmission reception point;

generate uplink information corresponding to the identification information of the target transmission reception point based on the identification information of the target transmission reception point; and transmit the uplink information;

wherein said generating the uplink information corresponding to the identification information of the target transmission reception point based on the identification information of the target transmission reception point comprises:

obtaining an initial value of a scrambling sequence of an uplink channel based on the identification information of the target transmission reception point;

generating the scrambling sequence of the uplink channel based on the initial value of the scrambling sequence of the uplink channel; and adopting the scrambling sequence of the uplink channel to scramble the uplink information to be transmitted;

wherein said obtaining the initial value of the scrambling sequence of the uplink channel based on the identification information of the target transmission reception point comprises:

calculating the initial value $c_{init}$ of the scrambling sequence of the uplink channel based on following formula, $$c_{init} = n_{RNTI} \square 2^{15} + n_{ID} + n,$$

where n is related to the identification information of the target transmission reception point, and different transmission reception points correspond to different values of n; $n_{RNTI}$ is obtained based on a C-RNTI; in response to $n_{ID}$ being configured by a higher layer, the $n_{ID}$ represents a data scrambling ID of a Physical Uplink Shared Channel configured by a higher layer, otherwise the $n_{ID}$ represents a cell ID.

10. The non-transitory computer-readable storage medium according to claim 9, wherein said generating the uplink information corresponding to the identification information of the target transmission reception point based on the identification information of the target transmission reception point comprises:

obtaining an initial value of an uplink reference signal based on the identification information of the target transmission reception point; and generating the uplink reference signal based on the initial value of the uplink reference signal.

11. The non-transitory computer-readable storage medium according to claim 10, wherein said obtaining the initial value of the uplink reference signal based on the identification information of the target transmission reception point comprises:

calculating the initial value $c_{init}$ of the uplink reference signal based on following formula, $$c_{init} = (2^{17}(N_{symb}^{slot} n_{s,f}^{\mu} + l + 1)(2N_{ID}^{0} + 1) + 2N_{ID}^{0} + n) \bmod 2^{31}$$

wherein, n is related to the identification information of the target transmission reception point, and different transmission reception points correspond to different values of n; l represents an OFDM symbol number within a slot, n represents a slot number in a radio frame f with a subcarrier spacing μ; in response to $N_{ID}^{0}$ being configured by a higher layer, the $N_{ID}^{0}$ represents a scrambling ID configured by a higher layer, otherwise the $N_{ID}^{0}$ represents a cell ID.

12. The non-transitory computer-readable storage medium according to claim 9, wherein said generating the uplink information corresponding to the identification information of the target transmission reception point based on the network configuration information comprises:

performing a logical AND operation on transmission data of an uplink transmission resource corresponding to the target transmission reception point and transmission data of uplink transmission resources corresponding to other transmission reception points, in response to detecting that the uplink transmission resource corresponding to the target transmission reception point and uplink transmission resources corresponding to other transmission reception points overlap; and taking a result of the logical AND operation as the uplink information.

\* \* \* \* \*